US011181476B2

(12) United States Patent
Wang et al.

(10) Patent No.: US 11,181,476 B2
(45) Date of Patent: Nov. 23, 2021

(54) MINIATURE FULL ANALYSIS DEVICE AND METHOD FOR MANUFACTURING THE SAME

(71) Applicant: BOE Technology Group Co., Ltd., Beijing (CN)

(72) Inventors: Fangzhou Wang, Beijing (CN); Pengxia Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/911,352

(22) Filed: Jun. 24, 2020

(65) Prior Publication Data

US 2021/0190685 A1    Jun. 24, 2021

(30) Foreign Application Priority Data

Dec. 20, 2019 (CN) .......................... 201911326831.7

(51) Int. Cl.
*G01N 21/59* (2006.01)
*G02F 1/1337* (2006.01)
*G02F 1/1343* (2006.01)

(52) U.S. Cl.
CPC ........... *G01N 21/59* (2013.01); *G02F 1/1337* (2013.01); *G02F 1/1343* (2013.01); *G01N 2201/067* (2013.01)

(58) Field of Classification Search
CPC ..... G02F 1/1337; G02F 1/1343; G01N 21/59; G01N 2201/067; B01L 3/502707; B01L 3/5027
See application file for complete search history.

(56) References Cited

U.S. PATENT DOCUMENTS

| 7,362,429 B2 | 4/2008 | Gilby |
| 8,107,067 B2 | 1/2012 | Gilby |

(Continued)

FOREIGN PATENT DOCUMENTS

| CN | 101099186 A | 1/2008 |
| CN | 106783904 A | 5/2017 |

(Continued)

OTHER PUBLICATIONS

First Office Action, including Search Report, for Chinese Patent Application No. 201911326831.7, dated Mar. 18, 2021, 24 pages.

*Primary Examiner* — Jia X Pan (74) *Attorney, Agent, or Firm* — Westman, Champlin & Koehler, P.A.

(57) ABSTRACT

A miniature full analysis device and a manufacturing method therefor are provided, the miniature full analysis device includes: a substrate; a main channel extending in a first direction; at least one secondary channel extending in a second direction intersecting the first direction, one end of the secondary channel is connected to the main channel, and the secondary channel is configured to be switched between a first state in which the detection light does not enter the secondary channel and a second state in which the detection light enters the secondary channel, and is transmitted in the second direction, the other end of the secondary channel has a reflective surface which is configured to reflect the detection light to a microfluidic sensing layer which is configured to carry a liquid to be analyzed and to detect the detection light passing through the liquid to be analyzed.

19 Claims, 8 Drawing Sheets

(56) References Cited

U.S. PATENT DOCUMENTS

| | | |
|---|---|---|
| 8,289,511 B2 | 10/2012 | Gilby |
| 8,508,376 B2 | 8/2013 | Knox et al. |
| 9,007,223 B2 | 4/2015 | Knox et al. |
| 9,594,066 B2 | 3/2017 | Knox et al. |
| 10,161,866 B2 | 12/2018 | Knox et al. |
| 10,553,632 B2 | 2/2020 | Ma |
| 10,802,014 B2 | 10/2020 | Yu et al. |
| 2005/0078308 A1 | 4/2005 | Gilby |
| 2008/0297360 A1 | 12/2008 | Knox et al. |
| 2009/0009758 A1 | 1/2009 | Gilby |
| 2012/0092664 A1 | 4/2012 | Gilby |
| 2014/0022547 A1 | 1/2014 | Knox et al. |
| 2015/0160175 A1 | 6/2015 | Knox et al. |
| 2015/0369798 A1 | 12/2015 | Yu et al. |
| 2016/0089672 A1 | 3/2016 | Chisholm |
| 2017/0146454 A1 | 5/2017 | Knox et al. |
| 2018/0190701 A1 | 7/2018 | Ma |
| 2019/0099756 A1 | 4/2019 | Pang et al. |
| 2020/0232910 A1* | 7/2020 | Meng ................ G02F 1/133509 |
| 2021/0011314 A1 | 1/2021 | Meng et al. |
| 2021/0048430 A1 | 2/2021 | Yu et al. |

FOREIGN PATENT DOCUMENTS

| | | |
|---|---|---|
| CN | 107051597 A | 8/2017 |
| CN | 107907483 A | 4/2018 |
| CN | 107971049 A | 5/2018 |
| CN | 109343243 A | 2/2019 |
| CN | 109946251 A | 6/2019 |
| EP | 1478913 A1 | 11/2004 |
| WO | 2018054134 A1 | 3/2018 |

\* cited by examiner

MINIATURE FULL ANALYSIS DEVICE AND METHOD FOR MANUFACTURING THE SAME

CROSS-REFERENCE TO RELATED APPLICATION

The present application claims the benefit of Chinese Patent Application No. 201911326831.7 filed on Dec. 20, 2019 in the National Intellectual Property Administration of China, the whole disclosure of which is incorporated herein by reference.

TECHNICAL FIELD

The present disclosure relates to the field of microfluidic detection and sensing, in particular to a miniature full analysis device and a method for manufacturing the same.

BACKGROUND

As people pay more and more attention to physical health, portable testing devices have gradually become an indispensable part of people's lives (such as daily blood testing, urine testing, drinking water pollution analysis, etc.). The miniature full analysis system is to miniaturize and integrate conventional chemical analysis devices, transfer functions of the testing laboratory to the chip, and finally achieve a family use of experimental analysis.

SUMMARY

Some embodiments of the present disclosure provide a miniature full analysis device, comprising: a substrate; a main channel which is provided on the substrate and extends in a first direction parallel to the substrate, the main channel being configured such that detection light is transmitted in the main channel in the first direction by total reflection; at least one secondary channel which is provided on the substrate and extends in a second direction parallel to the substrate, wherein the second direction intersects the first direction, one end of the secondary channel is connected to the main channel, and the secondary channel is configured to be switched between a first state and a second state, wherein, in response to the secondary channel being in the first state, the detection light does not enter the secondary channel, and in response to the secondary channel being in the second state, the detection light enters the secondary channel, and is transmitted in the second direction by total reflection; and a microfluidic sensing layer which is arranged to be parallel to the substrate and is configured to carry a liquid to be analyzed; wherein, the other end of the secondary channel has a reflective surface which is configured to reflect the detection light to the microfluidic sensing layer, and the microfluidic sensing layer is configured to detect the detection light passing through the liquid to be analyzed.

In some embodiments, the miniature full analysis device further comprising: a medium layer which is disposed on the substrate and has a first refractive index, a first groove extending in the first direction and at least one second groove extending in the second direction being provided in the medium layer, a first light transmission medium which has a second refractive index and is filled into the first groove to form the main channel; and a second light transmission medium which is filled into the second groove to form the secondary channel, wherein a refractive index of the second light transmission medium can be switched between a third refractive index and a fourth refractive index; the secondary channel is in the first state when the refractive index of the second light transmission medium is the third refractive index, and the secondary channel is in the second state when the refractive index of the second light transmission medium is the fourth refractive index, wherein the second refractive index is greater than the first refractive index, the third refractive index is less than or equal to the first refractive index, and the fourth refractive index is greater than or equal to the second refractive index.

In some embodiments, the first light transmission medium comprises liquid crystal or optical resin, and the second light transmission medium comprises liquid crystal.

In some embodiments, an acute angle between the first direction and the second direction is $\alpha$, and $\alpha$ satisfies the following formula:

$$\alpha + \theta 1 + \theta 2 = \pi$$
$$\sin^{-1}\frac{n1}{n4} \leq \theta 2 < \frac{\pi}{2}$$
$$\sin^{-1}\frac{n1}{n4} \leq \theta 2 < \frac{\pi}{2}$$

wherein $\theta 1$ is a first propagation angle of the detection light in the main channel, $\theta 2$ is a second propagation angle of the detection light in the secondary channel, n1 is the first refractive index, and n2 is the second refractive index, n4 is the fourth refractive index.

In some embodiments, the microfluidic sensing layer comprises: a microfluidic control layer which is configured to carry the liquid to be analyzed and control the movement of the liquid to be analyzed so that the detection light reflected by the reflective surface is irradiated to the liquid to be analyzed; and a sensing layer which is disposed on a side of the microfluidic control layer away from the substrate and is configured to detect a light intensity of the detection light reflected by the reflective surface and output an electrical signal according to the light intensity.

In some embodiments, the miniature full analysis further comprising: a processor configured to receive the electrical signal output by the sensing layer and determine an analysis structure of the liquid to be analyzed according to the electrical signal.

In some embodiments, the width of each of the main channel and the secondary channel is between 3 microns and 1000 microns.

In some embodiments, the miniature full analysis further comprising: a first electrode disposed between the second light transmission medium and the substrate; a second electrode disposed on a side of the second light transmission medium away from the substrate, wherein the refractive index of the second light transmission medium may be switched between the third refractive index and the fourth refractive index in response to a change in voltage between the first electrode and the second electrode.

In some embodiments, the miniature full analysis further comprising: a first alignment layer provided between the first electrode and the second light transmission medium; and the second alignment layer provided between the second electrode and the second light transmission medium.

In some embodiments, the miniature full analysis further comprising: a cover plate located on a side of the medium layer away from the substrate.

In some embodiments, the substrate is made of a transparent material.

In some embodiments, the microfluidic sensing layer is located on a side of the substrate away from the medium layer.

In some embodiments, the detection light is polarized light.

In some embodiments, the main channel comprises a first side wall and a second side wall both perpendicular to the substrate, the first side wall and the second side wall are arranged in parallel, the detection light is totally reflected between the first side wall and the second side wall and transmitted in the first direction in a plane parallel to the substrate between the first side wall and the second side wall.

In some embodiments, the secondary channel comprises a third sidewall and a fourth sidewall perpendicular to the substrate, the third and fourth sidewalls are arranged in parallel, the detection light is totally reflected between the third side wall and the fourth side wall and transmitted in the second direction in the plane parallel to the substrate between the third side wall and the fourth side wall.

Some embodiments of the present disclosure provide a method for manufacturing a miniature full analysis device, comprising: providing a substrate; forming a medium layer having a first refractive index on the substrate; forming a first groove extending in a first direction and at least one second groove extending in a second direction in the medium layer; filling the first groove with a first light transmission medium having a second refractive index to form a main channel, filling the second groove with a second light transmission medium to form at least one secondary channel, a refractive index of the second light transmission medium can be switched between a third refractive index and a fourth refractive index; and forming a microfluidic sensing layer on a side of the substrate away from the medium layer, wherein the second direction intersects the first direction, one end of the secondary channel is connected to the main channel, and the other end of the secondary channel has a reflective surface, the second refractive index is greater than the first refractive index, the third refractive index is less than or equal to the first refractive index, and the fourth refractive index is greater than or equal to the second refractive index.

In some embodiments, forming the microfluidic sensing layer on the side of the substrate away from the medium layer comprises: forming a microfluidic control layer on the side of the substrate away from the medium layer; and forming a sensing layer on a side of the microfluidic control layer away from the substrate.

In some embodiments, the method further comprising: forming a first electrode between the substrate and the secondary channel; and forming a second electrode on a side of the secondary channel away from the substrate.

In some embodiments, the method further comprising: forming a cover plate on a side of the medium layer away from the substrate.

BRIEF DESCRIPTION OF THE DRAWINGS

In order to more clearly explain the technical solutions of the embodiments of the present disclosure, the drawings of the embodiments will be briefly described below. Obviously, the drawings in the following description only relate to some embodiments of the present disclosure, rather than limit the present disclosure.

DETAILED DESCRIPTION OF EMBODIMENTS

Various aspects and features of the present disclosure are described here with reference to the drawings.

It should be understood that various modifications can be made to the embodiments applied here. Therefore, the above description should not be considered as a limitation, but merely as an example of an embodiment. Those skilled in the art will conceive other modifications within the scope and spirit of the present disclosure.

The drawings included in and forming a part of the specification illustrate embodiments of the present disclosure, and are used to explain the present disclosure together with the general description of the present disclosure given above and the detailed description of the embodiments given below.

These and other features of the present disclosure will become apparent from the following description of preferred forms of embodiments given as non-limiting examples with reference to the drawings.

It should also be understood that although the present disclosure has been described with reference to some specific embodiments, those skilled in the art can surely implement many other equivalent forms of the present disclosure, which have the features as recited in the claims and are therefore located within the scope of protection.

The above and other aspects, features, and advantages of the present disclosure will become more apparent in view of the following detailed description when combined with the drawings.

Hereinafter, specific embodiments of the present disclosure will be described with reference to the drawings; however, it should be understood that the applied embodiments are merely examples of the present disclosure, which can be implemented in various ways. Well-known and/or repetitive functions and structures have not been described in detail to avoid unnecessary or unnecessary details that may obscure the present disclosure. Therefore, the specific structural and functional details applied for herein are not intended to be limiting, but merely serve as a basis for claims and a representative basis for teaching those skilled in the art to use the present invention in a variety of practically any suitable detailed structures.

This specification may use the phrases "in one embodiment", "in another embodiment", "in yet another embodiment" or "in other embodiments", which may all refer to the same according to the present disclosure or one or more of the different embodiments.

The present disclosure provides a miniature full analysis device, including: a substrate, a main channel and at least one secondary channel disposed on the substrate, and a microfluidic sensing layer. The main channel is provided on the substrate and extends in a first direction parallel to the substrate. The main channel is configured such that the detection light is transmitted in the main channel in the first direction by total reflection. At least one secondary channel is provided on the substrate to extend in a second direction parallel to the substrate, the second direction intersects the first direction, one end of the secondary channel is connected to the main channel, and the secondary channel is configured to be switched between a first state a second state, wherein, in response to the secondary channel being in the first state, the detection light does not enter the secondary channel, and in response to the secondary channel being in the second state, the detection light enters the secondary channel and is transmitted in the second direction by total reflection. The microfluidic sensing layer is arranged parallel to the substrate and is configured to carry a liquid to be analyzed. The other end of the secondary channel has a reflective surface configured to reflect the detection light to the microfluidic sensing layer, and the microfluidic sensing layer is configured to detect the detection light passing through the liquid to be analyzed. In this way, the traditional chemical analysis devices can be miniaturized and integrated, and the functions of the testing laboratory can be transferred to the chip, and finally the family use of experimental analysis can be achieved. In some embodiments, the number of secondary channels is two or more, which can realize multi-channel detection of a miniature full analysis device and improve analysis efficiency.

Figure 1:
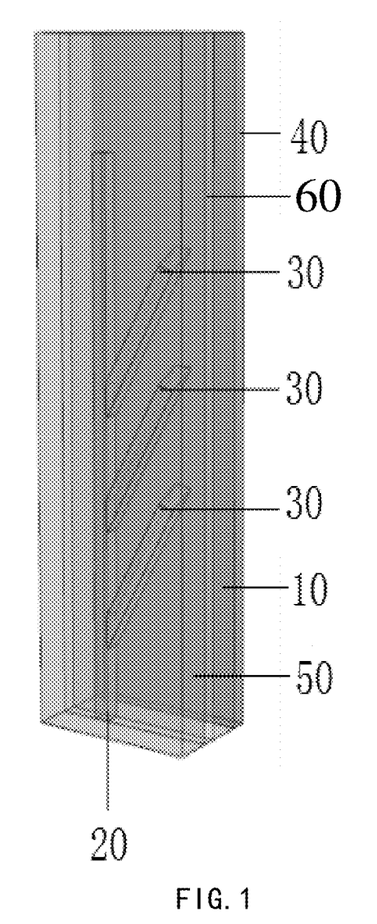
FIG. 1 is a schematic structural diagram of a miniature full analysis device according to some embodiments of the present disclosure.

FIG. 1 is a schematic structural diagram of a miniature full analysis device in some embodiments of the present disclosure. Some embodiments of the present disclosure provide a miniature full analysis device, which is mainly used for screening optical path of detection light, carrying the liquid to be analyzed, such as a droplet sample, and obtains the detection result based on detection light irradiating the droplet sample. As shown in FIG. 1, the miniature full analysis device mainly includes a substrate 10, a medium layer 60 provided on a side of the substrate 10, a main channel 20, at least one secondary channel 30 (FIG. 1 shows a case where there are three secondary channels), a microfluidic sensing layer 40 and a cover plate 50. The main channel 20 and the secondary channel 30 are formed in the medium layer 60, and the microfluidic sensing layer 40 is located on the side of the substrate 10 away from the medium layer 60, and is disposed in parallel with the substrate 10 for carrying the liquid to be analyzed. The cover plate 50 is provided with a side of the medium layer 60 away from the substrate 10 to protect the main channel 20 and the secondary channel 30.

Figure 2:
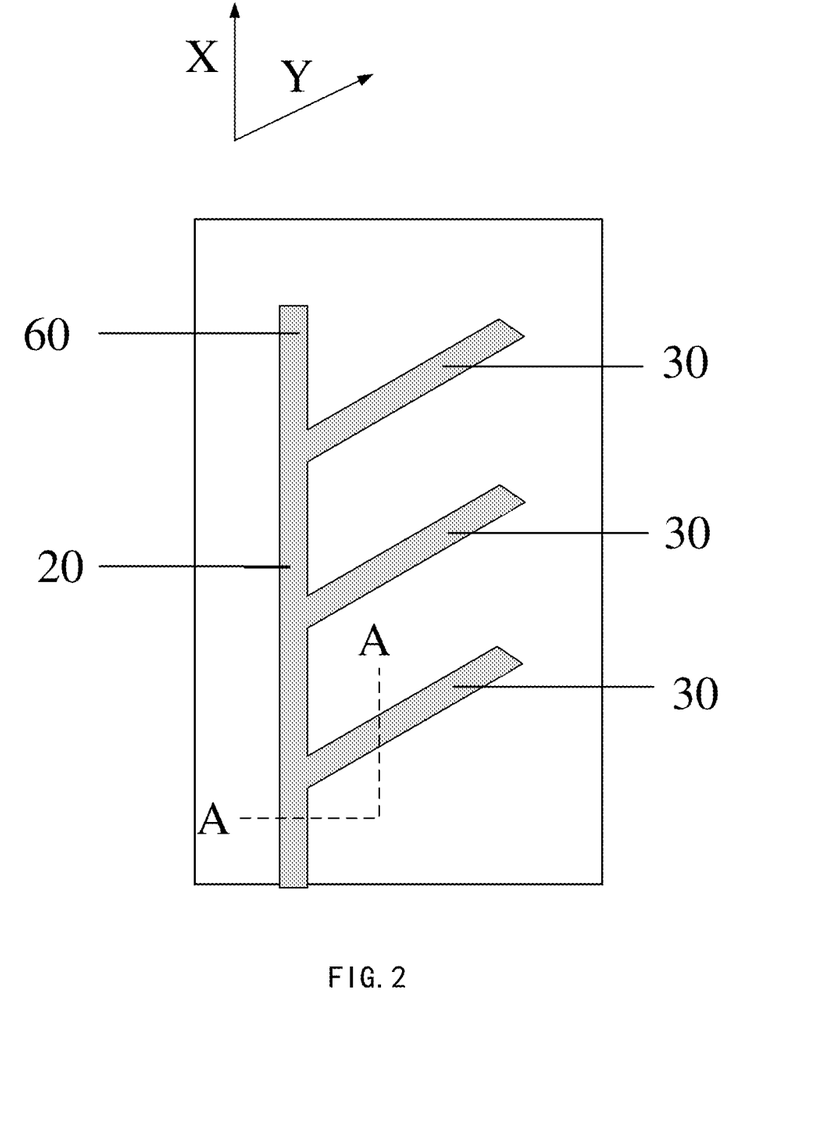
FIG. 2 is a schematic plan view of a miniature full analysis device according to some embodiments of the present disclosure.

FIG. 2 is a schematic plan view of a miniature full analysis device in some embodiments of the present disclosure, showing only the medium layer 60 and the main channel 20 and the secondary channel 30 in the medium layer 60. As shown in FIGS. 1 and 2, the main channel 20 extends in the first direction X parallel to the substrate 10, and is configured such that the detection light is transmitted in the main channel 20 along the first direction by total reflection. The secondary channel 30 extends in a second direction Y parallel to the substrate 10, and the first direction X and the second direction Y intersect each other. One end of the secondary channel 30 is connected to the main channel 20, and the secondary channel 30 is configured to switch between the first state and the second state. In response to the secondary channel 30 being in the first state, the detection light does not enter the secondary channel 30. In response to the secondary channel 30 being in the second state, and the detection light enters the secondary channel 30 and is transmitted in the second direction Y by total reflection. The other end of the secondary channel 30 has a reflective surface 31 configured to reflect the detection light to the microfluidic sensing layer 40, and the microfluidic sensing layer 40 is configured to detect the detection light passing through the liquid to be analyzed.

Figure 3:
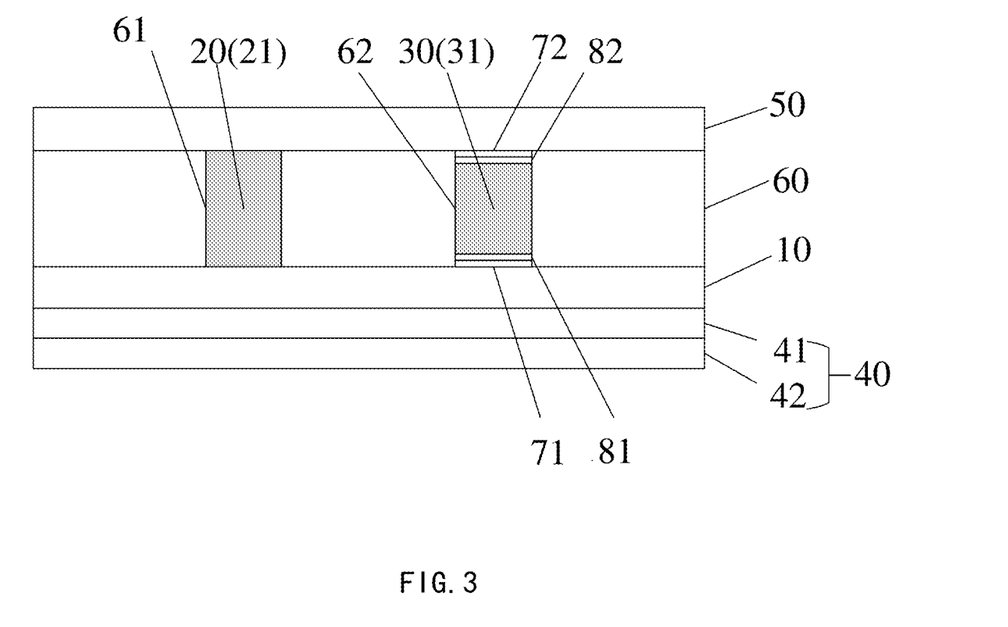
FIG. 3 is a schematic cross-sectional view of the miniature full analysis device in FIG. 2 along line A-A.

In some embodiments, the substrate 10 is mainly used to carry other components of the miniature full analysis device, and the main channel 20 and the secondary channel 30 are disposed in the medium layer 60. For example, a groove is formed in the medium layer 60, and the light transmission medium is filled in the groove to form the main channel 20 and the secondary channel 30. FIG. 3 is a schematic cross-sectional view taken along line A-A in FIG. 2. Specifically, as shown in FIG. 3, a first groove 61 extending in the first direction X and a second groove 62 extending in the second direction Y are formed in the medium layer 60 by, for example, etching. The groove 61 is filled with a first light transmission medium 21 to form the main channel 20, and the second groove 62 is filled with a second light transmission medium 31 to form the secondary channel 30. The medium layer 60 has a first refractive index n1, the first light transmission medium 21 has a second refractive index n2, and the refractive index of the second light transmission medium 31 can be switched between a third refractive index n3 and a fourth refractive index n4. When the refractive index of the second light transmission medium 31 is the third refractive index n3, the secondary channel 30 is in the first state, and when the refractive index of the second light transmission medium 31 is the fourth refractive index n4, the secondary channel 31 is in the second state.

Specifically, a first groove 61 for forming the main channel 20 and at least one second groove 62 for forming the secondary channel 30 are formed in the medium layer 60 on the substrate 10 by etching. In order to realize total reflection of the detection light in the main channel 20 and/or the secondary channel 30 which are subsequently formed, the first refractive index n1 of the medium layer 60 should be kept at a low refractive index, for example, 1.5, that is, the medium layer 60 is made of a low refractive index material. Using the above process, the groove shape with good steepness can be etched in the medium layer 60, which is used to form the main channel 20 and the secondary channel 30, thereby forming an optical waveguide, ensuring the stability of the optical waveguide profile, and reducing the loss during use. At the same time, in actual use, the detection light needs to pass through the substrate 10 and enter the microfluidic sensing layer 40, so the substrate 10 should be made of a transparent material. In some embodiments, the first groove for forming the main channel 20 and the at least one second groove for forming the secondary channel 30 may also be directly etched in the substrate 10, and the medium layer 60 is omitted. At this time, the first refractive index of the substrate 10 should be kept at a low refractive index, so that the detection light realizes total reflection in the main channel 20 and/or the secondary channel 30 which is/are subsequently formed.

Figure 4:
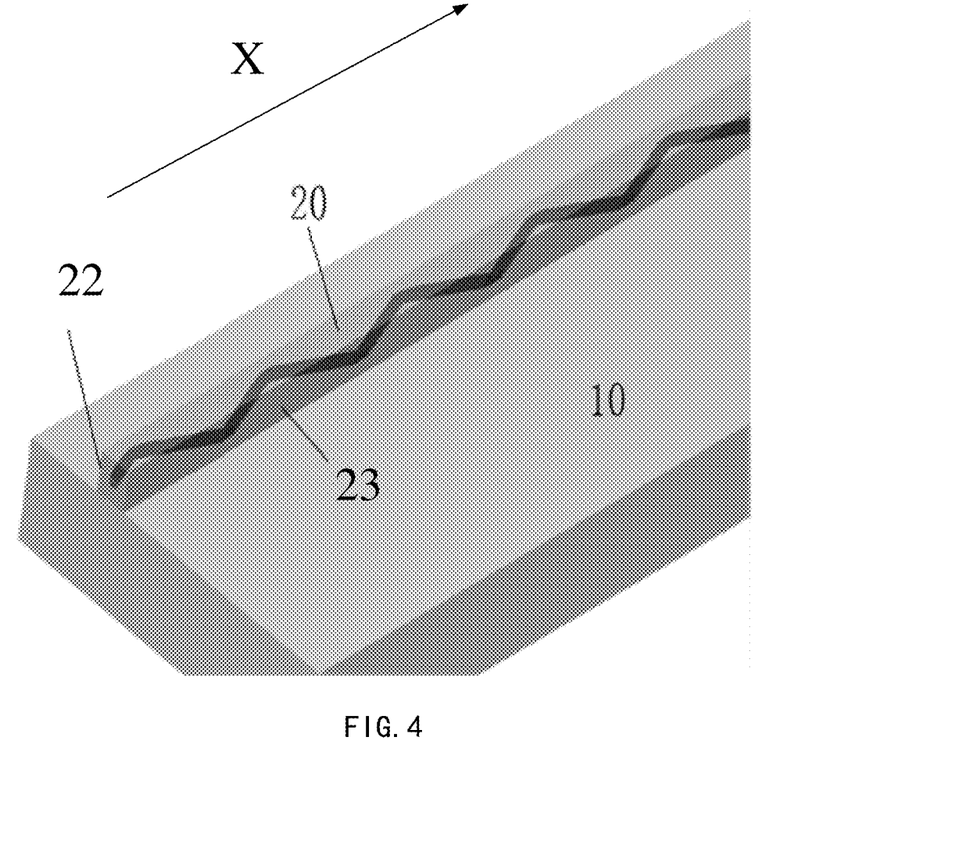
FIG. 4 is a schematic diagram of a path of detection light propagating in a main channel according to some embodiments of the present disclosure.

In some embodiments, the main channel 20 is formed in the medium layer 60. To facilitate total reflection of light, as shown in FIG. 3, the cross section of the main channel 20 is preferably etched into a rectangular shape, and its main function is to serve as a transmission channel of detection light. A light source that emits detection light should be provided at the end of the transmission channel that receives incident detection light. The detection light is, for example, polarized light, and the light source is, for example, a polarized light source. The main channel 20 is formed by, for example, filling the first groove 61 with a first light transmission medium 21 of a fixed refractive index (i.e., a second refractive index n2), for example, liquid crystal or optical resin. In order to function as an optical waveguide, the second refractive index n2 of the first light transmission medium 21 should be greater than the first refractive index n1 of the medium layer 60, for example, the second refractive index n2 of the first light transmission medium 21 is 1.7, ensuring detection light to achieve total reflection propagation in the main channel 20. Specifically, without considering the secondary channel 30 or the secondary channel 30 being closed, the path of the detection light propagating in the main channel 20 is shown in FIG. 4, and FIG. 4 is a schematic diagram of a path of detection light propagating in a main channel according to some embodiments of the present disclosure. In FIG. 4, in order to clearly embody the path of the detection light propagating in the main channel, only the substrate 10 and the main channel 20 are shown, and the medium layer 60 is omitted. As shown in FIG. 4, the main channel 20 includes a first side wall 22 and a second side wall 23 perpendicular to the substrate 10. The first side wall 22 and the second side wall 23 are arranged in parallel, and extend along the first direction X. The detection light is totally reflected between the first side wall 22 and the second side wall 23 of the main channel 20, that is, the detection light is transmitted in the first direction X by total reflection in a plane parallel to the substrate 10 between the first side wall 22 and the second side wall 23.

The secondary channels 30 are also formed in the medium layer 60, and the number of the secondary channels is one or more. In this embodiment, an example in which there are three secondary channels 30 is provided. In fact, the number of secondary channels 30 can be adjusted according to specific needs. The secondary channel 30 is formed by, for example, filling a second light transmission medium 31 in the second groove 62, for example, a liquid crystal with a variable refractive index, and its third refractive index n3, for example, an ordinary light refractive index, is less than or equal to the first refractive index n1 of the medium layer 60, and its fourth refractive index n4, for example, an extraordinary light refractive index, is greater than or equal to the second refractive index n2 of the first light transmission medium 21, and one end of the secondary channel 30 is connected to the main channel 20, a certain angle is formed between the secondary channel 30 and the main channel 20.

As shown in FIG. 3, opposite electrodes are provided on the upper and lower surfaces of the secondary channel 30. Specifically, the first electrode 71 is provided between the second light transmission medium 31 and the substrate 10, and the second electrode 71 is provided between the second light transmission medium 31 and the cover plate 50, in addition, For the control of the liquid crystal layer, it is usually necessary to set an alignment layer. As shown in FIG. 3, the first alignment layer 81 is provided between the first electrode 71 and the second light transmission medium 31, the second alignment layer 82 is provided between the second electrode 72 and the second light transmission medium 31. By adjusting the change in voltage between the first electrode 71 and the second electrode 72 to adjust the deflection state of the liquid crystal molecules, the refractive index of the second light transmission medium is adjusted. For example, when no voltage is applied between the first electrode 71 and the second electrode 72, the refractive index of the second light transmission medium is the third refractive index n3, such as the ordinary light refractive index, when a predetermined voltage is applied between the first electrode 71 and the second electrode 72, the liquid crystal as the second light transmission medium is deflected under the action of the voltage, and the refractive index of the second light transmission medium becomes the fourth refractive index n4, for example, an extraordinary optical refractive index. In addition, the other end of the secondary channel 30 has a reflective surface 32 having a certain inclination angle. Its function is to deflect the detection light transmitted in the secondary channel 3 so that the detection light enters the microfluidic sensing layer 40 through the transparent substrate 10 to implement the detection function.

Figure 5:
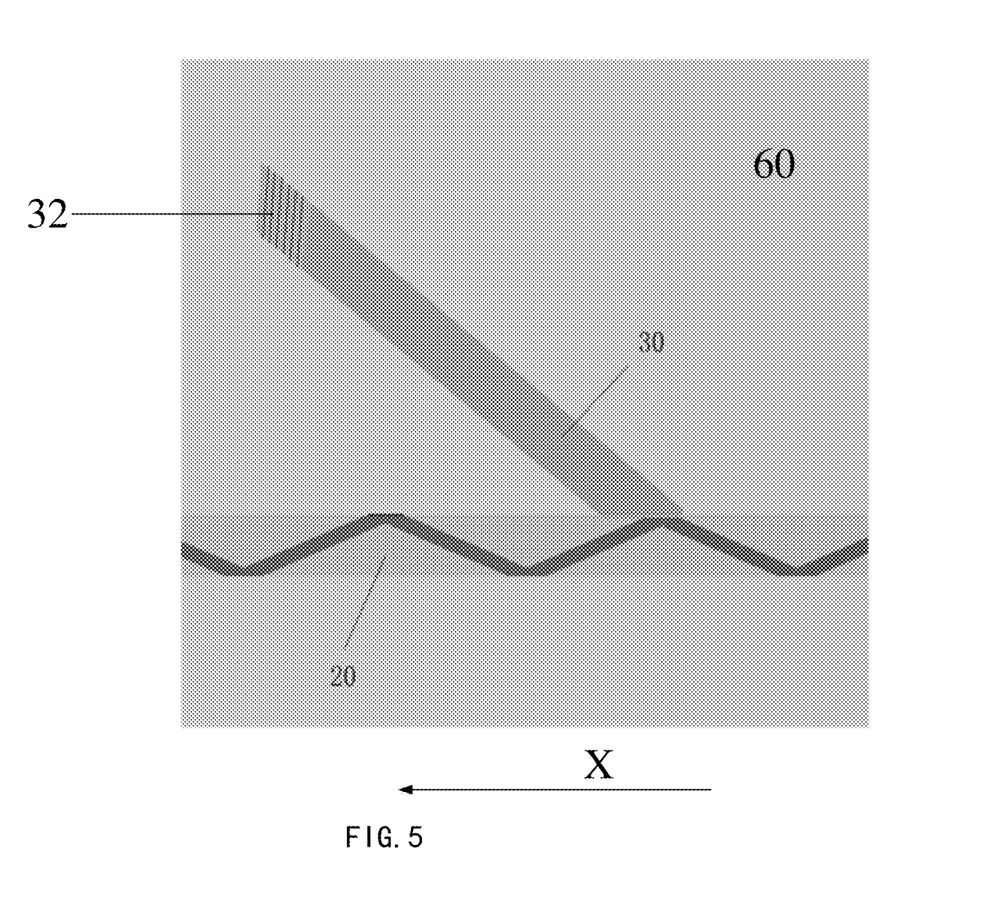
FIG. 5 is a schematic diagram of a propagation path of detection light when no voltage is applied to a secondary channel according to some embodiments of the present disclosure.
Figure 6:
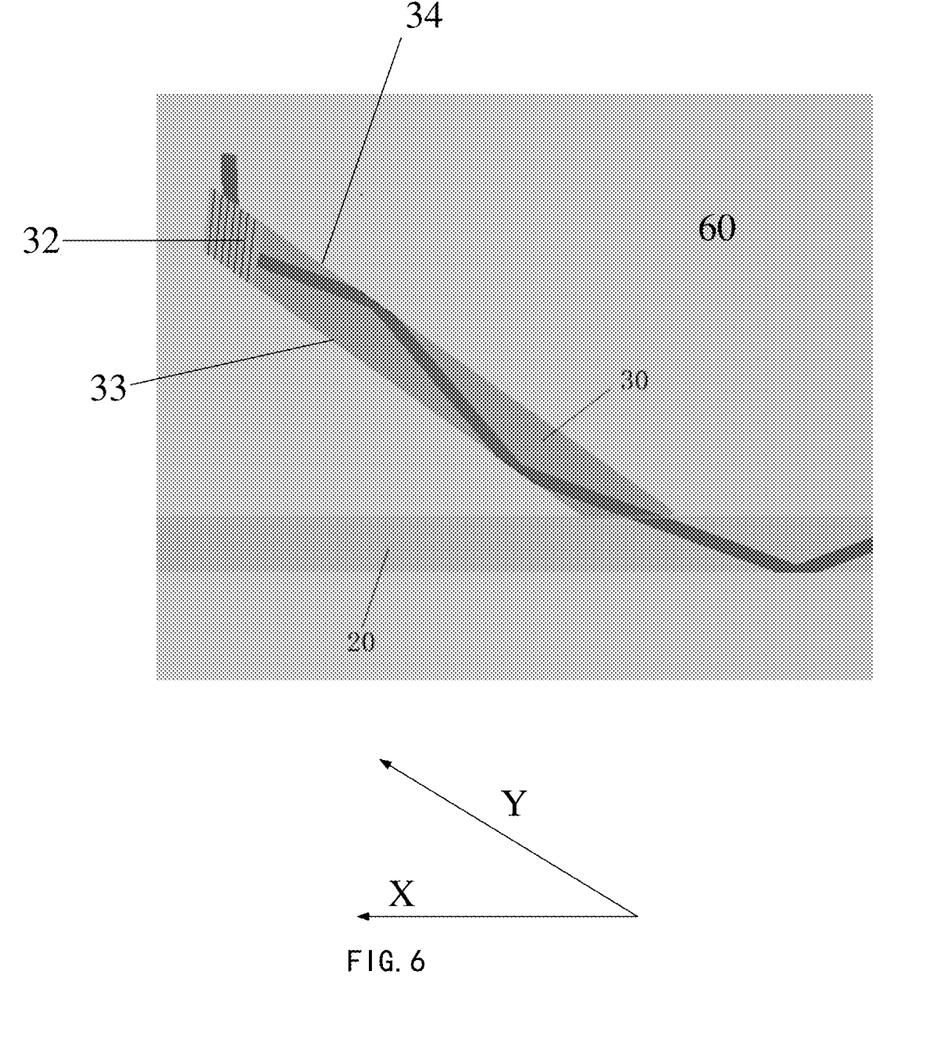
FIG. 6 is a schematic diagram of a propagation path of detection light when a voltage is applied to a secondary channel according to some embodiments of the present disclosure.

Specifically, when no voltage is applied to the secondary channel 30, that is, no voltage is applied between the first electrode 71 and the second electrode 72, the refractive index of the second light transmission medium 31 is the third refractive index n3, and the third refractive index n3 of the second transmission medium 31 is equal to or smaller than the first refractive index n1 of the medium layer 60, that is, the secondary channel 30 is in the first state, in this case, the propagation path of the detection light is shown in FIG. 5, that is, the detection light is only transmitted by total reflection in the main channel 20. Since the second refractive index n2 of the first light transmission medium 11 is greater than the third refractive index n3 of the second light transmission medium 31, and the third refractive index n3 of the second light transmission medium 31 is less than or equal to the first refractive index n1 of the medium layer 60, and the detection light transmitted along the first direction X by total reflection in the main channel 20 cannot enter the secondary channel 30. At this time, it can be called a light lock state. When a voltage is applied to the secondary channel 30, that is, when a predetermined voltage is applied between the first electrode 71 and the second electrode 72, the liquid crystal as the second light transmission medium 31 is deflected, and its refractive index becomes the fourth refractive index n4, in this case, the fourth refractive index n4 of the second light transmission medium 31 is greater than or equal to the second refractive index n2 of the first light transmission medium 21, for example, the fourth refractive index n4 of the second light transmission medium 31 is the same as the second refractive index n2 of the first light transmission medium 21. At this time, the propagation path of the detection light is as shown in FIG. 6. At the end of the secondary channel 30 connected to the main channel, the total reflection condition in which the detection light is transmitted in the main channel 20 is destroyed, and the detection light can enter the secondary channel 30 from the main channel 20 for transmission. Specifically, the secondary channel 30 has a third side wall 33 and a fourth side wall 34 that are perpendicular to the substrate 10, and the third side wall 33 and the fourth side wall 34 are arranged in parallel and extend along the second direction Y. The detection light entering the secondary channel 30 is totally reflected between the third side wall 33 and the fourth side wall 34 of the secondary channel 30, that is, the detection light is transmitted along the second direction Y by total reflection by total reflection in a plane parallel to the substrate 10 between the third side wall 33 and the fourth side wall 34, and the detection light is deflected when it reaches the reflective surface at the other end of the secondary channel 30, so that the detection light enters the microfluidic sensing layer 40 through the transparent substrate 10. At this time, it can be called a light extraction state.

It should be understood that, during the propagation of the detection light in the secondary channel 30, total reflection is achieved on the third side wall 33 and the fourth side wall 34 (i.e., both side walls perpendicular to the substrate 10) of the secondary channel 30. Therefore, it is possible to avoid that the first electrode 71 provided at the lower surface of the secondary channel 30 and the second electrode 72 provided at the upper surface of the secondary channel 30 affect the transmission of the detection light, which may affect the final output of the detection light.

Figure 7:
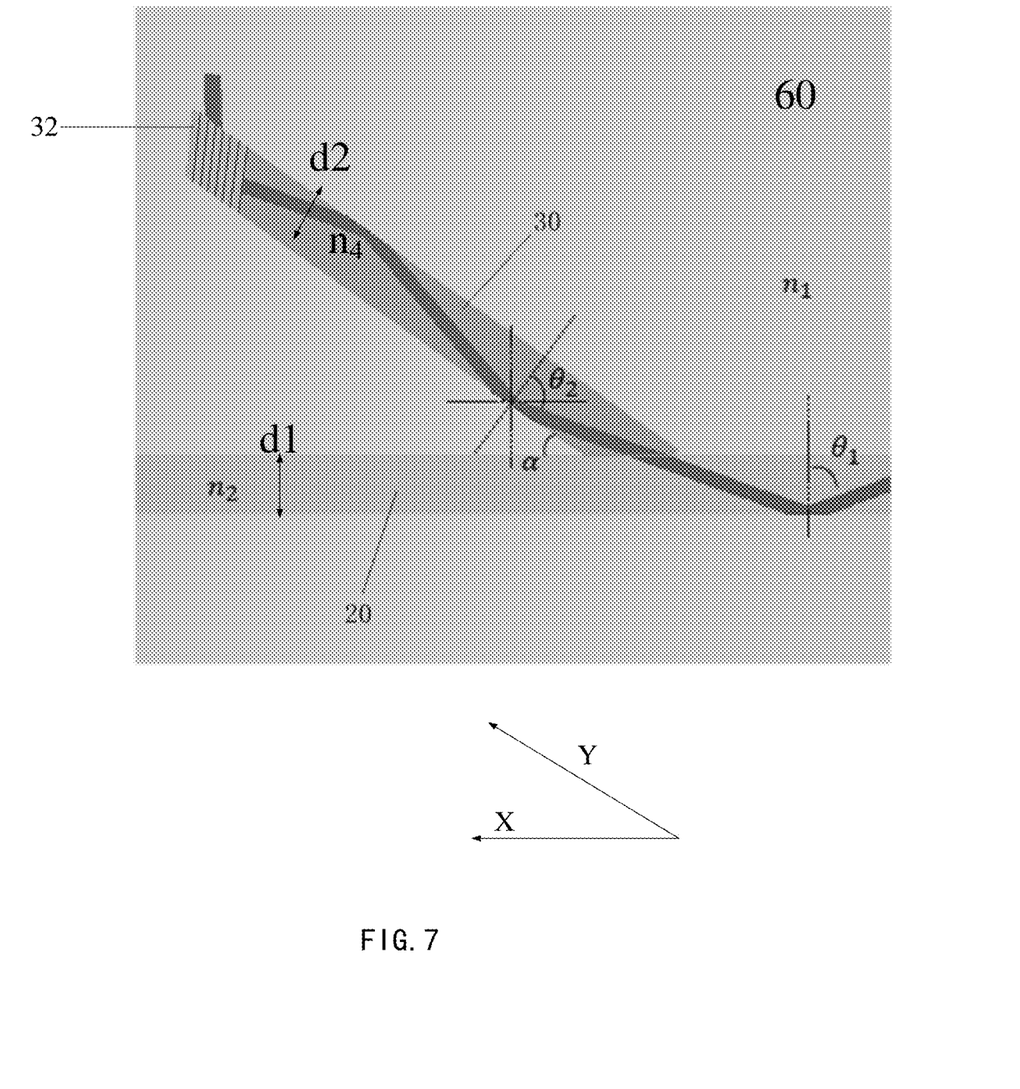
FIG. 7 is a schematic plan view of a miniature full analysis device according to some embodiments of the present disclosure.

FIG. 7 is a schematic plan view of a miniature full analysis device in some embodiments of the present disclosure. FIG. 7 shows only the medium layer, the main channel, and one secondary channel. Specifically, the width d1 of the main channel 20 and the width d2 of the secondary channel 30 may both be between 3 μm and 1000 μm, and they may be equal or different, depending on the size of the actual device. The angle α between the secondary channel 30 and the main channel 20 is determined according to the second refractive index n2 of the first light transmission medium 21, the first refractive index n1 of the medium layer 60, and the fourth refractive index n4 of the second light transmission medium 31 to ensure that the detection light may enter the secondary channel 30 from the main channel 20. FIG. 7 shows the angle α between the secondary channel 30 and the main channel 20. α satisfies the following formula:

$$\sin^{-1}\frac{n1}{n2} \le \theta 1 < \frac{\pi}{2} \quad (1)$$

$$\sin^{-1}\frac{n1}{n2} \le \theta 1 < \frac{\pi}{2} \quad (2)$$

$$\alpha + \theta 1 + \theta 2 = \pi \quad (3)$$

wherein θ1 is the first propagation angle of the detection light in the main channel, θ2 is the second propagation angle of the detection light in the secondary channel, n1 is the first refractive index, and n2 is the second refractive index, n4 is the fourth refractive index.

Taking n1=1.5 and n2=n4=1.7 as an example, the value range of α finally calculated is 0<α<56°.

The propagation angle described herein refers to the incident angle of the detection light on the total reflection surface of the main channel or the secondary channel when the detection light propagates in the main channel or the secondary channel by total reflection.

The other end of the secondary channel 30 (the end which is disconnected with the main channel 20) has a reflective surface 32 for deflecting the detection light transmitted in the secondary channel 30 to the microfluidic sensing layer 40. Further, in order to deflect the detection light to the microfluidic sensing layer 40 provided on the side of the substrate 10 away from the medium layer, the reflective surface must be an end surface with a certain inclination angle. A cover plate 50 is further provided on the side of the medium layer 60 away from the substrate 10 to protect the main channel 20 and the plurality of secondary channels 30.

As shown in FIG. 3, the microfluidic sensing layer 40 is disposed on the side of the substrate 10 away from the medium layer 60, and it mainly includes a microfluidic control layer 41 and a sensing layer 42. The sensing layer 42 is located on the side of the microfluidic control layer 41 away from the substrate 10. Wherein, the microfluidic control layer can use electrowetting technology to control the splitting, movement and fusion of microfluidics (liquid to be analyzed, such as droplets to be analyzed). In the microfluidic control layer, the droplets to be analyzed need to be moved to the light exit position of any one of the secondary channels 30, the sensing layer detects the light intensity comparison of the droplet to be analyzed before and after passing, and the droplet characteristics can be obtained after data processing. Specifically, the sensing layer 42 may include a sensor, such as a photoelectric sensor, and is used for receiving the light intensity of the detection light emitted from the secondary channel 30 after being absorbed or scattered by the droplet to be analyzed, and outputting the corresponding electric power according to the light intensity signal.

In order to realize the determination of the characteristics of the droplet to be analyzed, the miniature full analysis device should also include a processor which is connected to the photoelectric sensor in the microfluidic sensing layer 40. The processor receives the electrical signal output by the microfluidic sensing layer, and determines the characteristics of the droplet to be analyzed according to the size or degree of change of the electrical signal. When the type of droplets to be analyzed is different, the characteristics of the corresponding analysis are also different. For example, when the droplet to be analyzed is blood, the content of hemoglobin, the degree of antigen-antibody reaction, etc. can be correspondingly analyzed; and when the droplet to be analyzed is fruit juice, the sugar content of the juice can be correspondingly determined. In addition, the miniature full analysis device should also include a power supply, a light source device, etc. The miniature full analysis device can also include a display device, which displays various features to be analyzed processed by the processor, which is convenient for users to view.

In actual use, the microfluidic control layer 41 of the microfluidic sensing layer 40 controls the liquid droplets carried thereon to move until it reaches the optical outlet of the secondary channel 30. The refractive index of the second light transmission medium 31 is changed by controlling the voltage applied to the secondary channel 30, so that the detection light may enter the secondary channel 30 from the main channel 20 and exit toward the microfluidic sensing layer 40 via the reflective surface when in use. When the droplet to be analyzed passes through the optical outlet of the secondary channel 30, the detection light is reflected, refracted, scattered, and absorbed by the droplet to be analyzed, the light intensity received by the sensing layer 42 of the microfluidic sensing layer 40 changes, and the magnitude of the output electrical signal also changes accordingly. Then the processor analyzes the value of the electrical signal to obtain the characteristics of the corresponding droplet to be analyzed. In addition, in the miniature full analysis device of this embodiment, multiple secondary channels are provided at the same time, and each secondary channel is controlled by its corresponding electrodes. It may provide a highly efficient, stable, and fast optical path screening function. In actual use, two or more types of droplets to be analyzed can be analyzed simultaneously, which improves the efficiency of analysis and detection.

Figure 8:
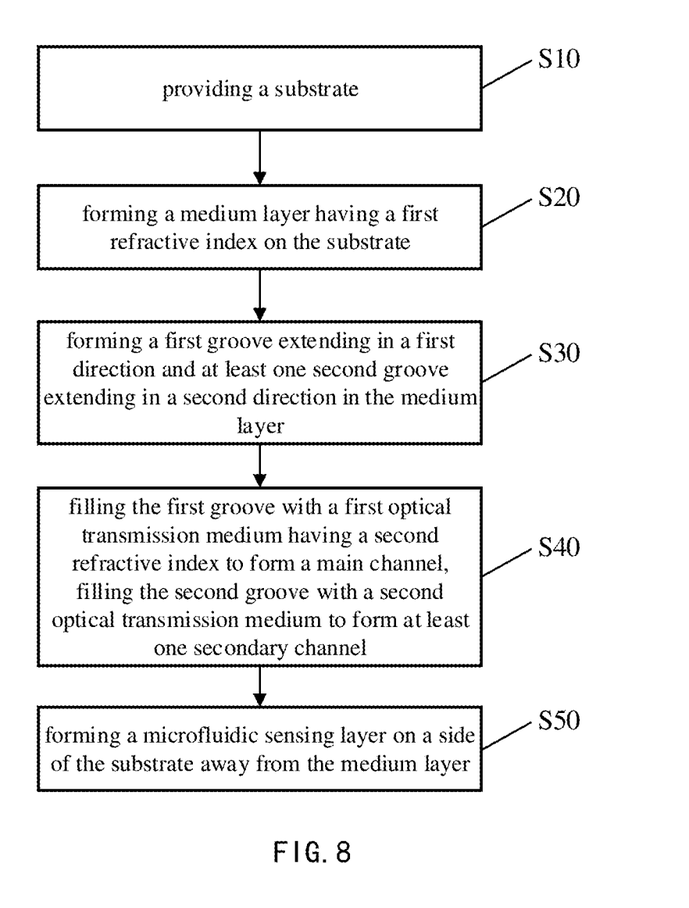
FIG. 8 is a flowchart of a method for manufacturing a miniature full analysis device according to some embodiments of the present disclosure.

Some embodiments of the present disclosure provide a method for manufacturing a miniature full analysis device. The manufacturing flowchart is shown in FIG. 8 and mainly includes the following steps:

S10, providing a substrate;

S20, forming a medium layer having a first refractive index on the substrate;

S30, forming a first groove extending in a first direction and at least one second groove extending in a second direction in the medium layer;

S40, filling the first groove with a first light transmission medium having a second refractive index to form a main channel, filling the second groove with a second light transmission medium to form at least one secondary channel, a refractive index of the second light transmission medium can be switched between a third refractive index and a fourth refractive index;

S50, forming a microfluidic sensing layer on a side of the substrate away from the medium layer.

The second direction intersects the first direction, one end of the secondary channel is connected to the main channel, the other end of the secondary channel has a reflective surface. The second refractive index is greater than the first refractive index, the third refractive index is less than or equal to the first refractive index, and the fourth refractive index is greater than or equal to the second refractive index.

Specifically, one end of the secondary channel communicates with the main channel, and an angle is formed between the secondary channel and the main channel, and the size of the angle depends on the first refractive index of the medium layer, the second refractive index of the first light transmission medium filled in the first groove and the fourth refractive index of the second light transmission medium filled in the second groove. The upper and lower surfaces of the secondary channel are parallel to the substrate, and the detection light is totally reflected on the left and right surfaces of the secondary channel. The reflective surface is used to deflect the detection light transmitted in the secondary channel to the microfluidic sensing layer, so that the detection light irradiates the droplet to be analyzed. The microfluidic sensing layer carries the droplet to be analyzed and converts and outputs the optical signal to the electrical signal; finally, the processor can analyze the characteristics of the droplet to be analyzed according to the electrical signal and present it to the user.

In some embodiments, forming the microfluidic sensing layer on the side of the substrate away from the medium layer includes the following steps:

forming a microfluidic control layer on the side of the substrate away from the medium layer;

forming a sensor on a side of the microfluidic control layer away from the substrate.

In some embodiments, the method for manufacturing the miniature full analysis device may further include the following steps:

forming a first electrode between the substrate and the secondary channel; and forming a second electrode on the side of the secondary channel away from the substrate;

In this way, a first electrode and a second electrode for controlling the state of the secondary channel can be formed, and applying a voltage between the first electrode and the second electrode can cause the secondary channel to be switched between the first state and the second state. In response to the secondary channel being in the first state, the detection light does not enter the secondary channel and can only be transmitted in the first direction in the main channel. In response to the secondary channel being in the second state, the detection light enters the secondary channel from the main channel and transmitted by total reflection along the second direction.

In some embodiments, the method for manufacturing the miniature full analysis device may further include the following steps:

forming a cover plate on a side of the medium layer away from the substrate.

In this way, the main channel and the secondary channel can be protected.

The miniature full analysis device manufactured in this embodiment, through multiple secondary channels with liquid crystal switches, can realize the control of each secondary channel during actual detection. That is, each secondary channel is controlled by its corresponding electrodes, thereby achieving simultaneous detection of multiple droplets and improving detection efficiency. The embodiments of the present disclosure can achieve efficient and stable light transmission through an optical waveguide, further improving the stability of detection.

The above embodiments are only exemplary embodiments of the present disclosure, and are not used to limit the present disclosure, and the protection scope of the present disclosure is defined by the claims. Those skilled in the art may make various modifications or equivalent replacements to the disclosure within the essence and protection scope of the disclosure, and such modifications or equivalent replacements shall also be deemed to fall within the protection scope of the disclosure.

What is claimed is:

1. A miniature full analysis device, comprising:
   a substrate;
   a main channel which is provided on the substrate and extends in a first direction parallel to the substrate, the main channel being configured such that detection light is transmitted in the main channel in the first direction by total reflection;
   at least one secondary channel which is provided on the substrate and extends in a second direction parallel to the substrate, wherein the second direction intersects the first direction, one end of the secondary channel is connected to the main channel, and the secondary channel is configured to be switched between a first state and a second state, wherein, in response to the secondary channel being in the first state, the detection light does not enter the secondary channel, and in response to the secondary channel being in the second state, the detection light enters the secondary channel, and is transmitted in the second direction by total reflection; and
   a microfluidic sensing layer which is arranged to be parallel to the substrate and is configured to carry a liquid to be analyzed;
   wherein, the other end of the secondary channel has a reflective surface which is configured to reflect the detection light to the microfluidic sensing layer, and the microfluidic sensing layer is configured to detect the detection light passing through the liquid to be analyzed.

2. The miniature full analysis device according to claim 1, further comprising:
   a medium layer which is disposed on the substrate and has a first refractive index, a first groove extending in the first direction and at least one second groove extending in the second direction being provided in the medium layer, a first light transmission medium which has a second refractive index and is filled into the first groove to form the main channel; and a second light transmission medium which is filled into the second groove to form the secondary channel, wherein a refractive index of the second light transmission medium can be switched between a third refractive index and a fourth refractive index; the secondary channel is in the first state when the refractive index of the second light transmission medium is the third refractive index, and the secondary channel is in the second state when the refractive index of the second light transmission medium is the fourth refractive index, wherein the second refractive index is greater than the first refractive index, the third refractive index is less than or equal to the first refractive index, and the fourth refractive index is greater than or equal to the second refractive index.

3. The miniature full analysis device according to claim 2, wherein the first light transmission medium comprises liquid crystal or optical resin, and the second light transmission medium comprises liquid crystal.

4. The miniature full analysis device according to claim 3, wherein an acute angle between the first direction and the second direction is α, and α satisfies the following formula:

$$\alpha + \theta 1 + \theta 2 = \pi$$
$$\sin^{-1}\frac{n1}{n4} \leq \theta 2 < \frac{\pi}{2}$$
$$\sin^{-1}\frac{n1}{n4} \leq \theta 2 < \frac{\pi}{2}$$

wherein θ1 is a first propagation angle of the detection light in the main channel, θ2 is a second propagation angle of the detection light in the secondary channel, n1 is the first refractive index, and n2 is the second refractive index, n4 is the fourth refractive index.

5. The miniature full analysis device according to 1, wherein the microfluidic sensing layer comprises:

a microfluidic control layer which is configured to carry the liquid to be analyzed and control the movement of the liquid to be analyzed so that the detection light reflected by the reflective surface is irradiated to the liquid to be analyzed; and a sensing layer which is disposed on a side of the microfluidic control layer away from the substrate and is configured to detect a light intensity of the detection light reflected by the reflective surface and output an electrical signal according to the light intensity.

6. The miniature full analysis device according to claim 5, further comprising:

a processor configured to receive the electrical signal output by the sensing layer and determine an analysis structure of the liquid to be analyzed according to the electrical signal.

7. The miniature full analysis device according to claim 1, wherein the width of each of the main channel and the secondary channel is between 3 microns and 1000 microns.

8. The miniature full analysis device according to claim 3, further comprising:

a first electrode disposed between the second light transmission medium and the substrate;

a second electrode disposed on a side of the second light transmission medium away from the substrate, wherein the refractive index of the second light transmission medium may be switched between the third refractive index and the fourth refractive index in response to a change in voltage between the first electrode and the second electrode.

9. The miniature full analysis device according to claim 8, further comprising:

a first alignment layer provided between the first electrode and the second light transmission medium; and the second alignment layer provided between the second electrode and the second light transmission medium.

10. The miniature full analysis device according to claim 2, further comprising:

a cover plate located on a side of the medium layer away from the substrate.

11. The miniature full analysis device according to claim 1, wherein the substrate is made of a transparent material.

12. The miniature full analysis device according to claim 2, wherein the microfluidic sensing layer is located on a side of the substrate away from the medium layer.

13. The miniature full analysis device according to claim 1, wherein the detection light is polarized light.

14. The miniature full analysis device according to claim 1, wherein the main channel comprises a first side wall and a second side wall both perpendicular to the substrate, the first side wall and the second side wall are arranged in parallel, the detection light is totally reflected between the first side wall and the second side wall and transmitted in the first direction in a plane parallel to the substrate between the first side wall and the second side wall.

15. The miniature full analysis device according to claim 1, wherein the secondary channel comprises a third sidewall and a fourth sidewall perpendicular to the substrate, the third and fourth sidewalls are arranged in parallel, the detection light is totally reflected between the third side wall and the fourth side wall and transmitted in the second direction in the plane parallel to the substrate between the third side wall and the fourth side wall.

16. A method for manufacturing a miniature full analysis device, comprising:

providing a substrate;

forming a medium layer having a first refractive index on the substrate;

forming a first groove extending in a first direction and at least one second groove extending in a second direction in the medium layer;

filling the first groove with a first light transmission medium having a second refractive index to form a main channel, filling the second groove with a second light transmission medium to form at least one secondary channel, a refractive index of the second light transmission medium can be switched between a third refractive index and a fourth refractive index; and forming a microfluidic sensing layer on a side of the substrate away from the medium layer, wherein the second direction intersects the first direction, one end of the secondary channel is connected to the main channel, and the other end of the secondary channel has a reflective surface, the second refractive index is greater than the first refractive index, the third refractive index is less than or equal to the first refractive index, and the fourth refractive index is greater than or equal to the second refractive index.

17. The method according to 16, wherein forming the microfluidic sensing layer on the side of the substrate away from the medium layer comprises:
   forming a microfluidic control layer on the side of the substrate away from the medium layer; and
   forming a sensing layer on a side of the microfluidic control layer away from the substrate.

18. The method according to 16, further comprising:
   forming a first electrode between the substrate and the secondary channel; and
   forming a second electrode on a side of the secondary channel away from the substrate.

19. The method according to 16, further comprising:
   forming a cover plate on a side of the medium layer away from the substrate.

\* \* \* \* \*